(12) United States Patent
Nordsell et al.

(10) Patent No.: US 12,313,838 B2
(45) Date of Patent: *May 27, 2025

(54) REFLECTIVE DISPLAY DEVICES AND COMPONENTS

(71) Applicant: Applied Materials, Inc., Santa Clara, CA (US)

(72) Inventors: Robert Anthony Nordsell, San Jose, CA (US); Arvinder M. Chadha, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,770

(22) Filed: Nov. 3, 2023

(65) Prior Publication Data

US 2024/0142767 A1    May 2, 2024

Related U.S. Application Data

(63) Continuation of application No. 17/751,240, filed on May 23, 2022, now Pat. No. 11,846,768, which is a
(Continued)

(51) Int. Cl.
*G02B 26/02* (2006.01)
*G02B 5/22* (2006.01)
*G02B 26/00* (2006.01)

(52) U.S. Cl.
CPC .............. *G02B 26/02* (2013.01); *G02B 5/22* (2013.01); *G02B 26/005* (2013.01); *G02B 2207/101* (2013.01); *G02B 2207/113* (2013.01)

(58) Field of Classification Search
None
See application file for complete search history.

(56) References Cited

U.S. PATENT DOCUMENTS

| 6,538,801 B2 | 3/2003 | Jacobson et al. |
| 6,580,545 B2 | 6/2003 | Morrison et al. |

(Continued)

FOREIGN PATENT DOCUMENTS

| CN | 108231011 A | 6/2018 |
| JP | 2019028229 A | 2/2019 |

(Continued)

OTHER PUBLICATIONS

Application No. PCT/US2022/046194, International Preliminary Report on Patentability, Mailed on Apr. 25, 2024, 5 pages.
(Continued)

*Primary Examiner* — Stephone B Allen
*Assistant Examiner* — Tamara Y. Washington
(74) *Attorney, Agent, or Firm* — Kilpatrick Townsend & Stockton LLP (57) ABSTRACT

Exemplary reflective display components are described. These reflective display components may include a microwell layer having a first and a second quantum dot well that each include a plurality of nanoparticles configured to emit a color of light. The microwell layer further has a third well. The reflective display components further include an electrowetting layer positioned above the microwell layer, where the electrowetting layer is operable to independently adjust an intensity of light emitted from the first and second quantum dot wells and the third well in the microwell layer.

20 Claims, 4 Drawing Sheets

Related U.S. Application Data continuation of application No. 17/577,652, filed on Jan. 18, 2022, now Pat. No. 11,360,298.

(60) Provisional application No. 63/256,448, filed on Oct. 15, 2021.

(56) References Cited

U.S. PATENT DOCUMENTS

| | | | |
|---|---|---|---|
| 8,264,777 | B2 | 9/2012 | Skipor et al. |
| 9,678,330 | B1 | 6/2017 | Sakai |
| 10,234,677 | B1 | 3/2019 | Guntaka et al. |
| 11,360,298 | B1* | 6/2022 | Nordsell ................ G02B 26/02 |
| 11,846,768 | B2* | 12/2023 | Nordsell ................ G02B 5/22 |
| 2008/0297880 | A1 | 12/2008 | Steckl et al. |
| 2010/0033798 | A1 | 2/2010 | Wang et al. |
| 2013/0120678 | A1* | 5/2013 | Chao ....................... F21K 9/60 |
| | | | 977/774 |
| 2015/0308658 | A1 | 10/2015 | Shin et al. |
| 2016/0180780 | A1 | 6/2016 | Chen et al. |
| 2017/0184839 | A1* | 6/2017 | Tigelaar ............... G02B 26/005 |
| 2019/0278149 | A1* | 9/2019 | Crouse ................ G02F 1/1676 |
| 2021/0027435 | A1* | 1/2021 | Tao ........................... G09G 5/14 |
| 2021/0325755 | A1 | 10/2021 | Meng et al. |
| 2023/0091777 | A1* | 3/2023 | Hack .................... G02B 5/1809 |
| | | | 257/40 |

FOREIGN PATENT DOCUMENTS

| | | | |
|---|---|---|---|
| KR | 20120021075 A | 3/2012 | |
| WO | WO-2019226634 A1 * | 11/2019 | .......... G02B 26/005 |

OTHER PUBLICATIONS

Application No. PCT/US2022/046194, International Search Report and Written Opinion, Mailed on Feb. 3, 2023, 9 pages.

JP2024-522508, "Office Action", Mar. 6, 2025, 5 pages.

* cited by examiner

REFLECTIVE DISPLAY DEVICES AND COMPONENTS

CROSS-REFERENCE TO RELATED APPLICATIONS

This application is a continuation of U.S. Non-Provisional Application Ser. No. 17/751,240, filed May 23, 2022, which is a continuation of U.S. Non-Provisional Application Ser. No. 17/577,652, filed Jan. 18, 2022, which claims the benefit of, and priority to U.S. Provisional Application Ser. No. 63/256,448, filed Oct. 15, 2021, which is hereby incorporated by reference in its entirety for all purposes.

TECHNICAL FIELD

The present technology relates to reflective display devices and components. More specifically, the present technology relates to reflective display devices and components that include a combination of quantum dot and electrowetting technology to display images.

BACKGROUND

Display devices and components are used to display images. These images include text, pictures, video, and status indicators, among other kinds of images. In some cases, the display device is a stand-alone device dedicated to displaying images like a television, monitor, or electronic billboard, among other dedicated display devices. In additional cases, the display device or component is incorporated into another device, such as a phone, computer, tool, instrument, appliance, or vehicle, among other devices with incorporated displays.

The performance of a display device or component may be judged on many characteristics, including power consumption, brightness, color output, and rendering time, among other performance characteristics. There are often tradeoffs in the improvement of the performance characteristics of a display device. For example, it is often the case that an increase in the brightness of displayed images comes at the cost of increased power consumption by the display device. It is also often the case that improved color output in the form of an expanded color gamut comes at the cost of reduced brightness of the display device. Thus, there is a need for improved designs of display devices and components that increase one or more performance characteristics of the device or component without significantly decreasing one or more other performance characteristics.

SUMMARY

Embodiments of the present technology include reflective display components that include a microwell layer. The microwell layer includes a first and a second quantum dot well that each include a reflective layer lining an interior wall of the well, and a plurality of nanoparticles configured to emit a color of light. The microwell layer further includes a third well that includes the reflective layer. The reflective display component also include an electrowetting layer positioned above the microwell layer. The electrowetting layer is operable to independently adjust an intensity of light emitted from the first and second quantum dot wells and the third well in the microwell layer. The reflective display component further includes a light guide layer positioned above or below the electrowetting layer. The light guide layer is operable to distribute light projected on the reflective display component into the first and second quantum dot wells, and the third well.

In additional embodiments, the plurality of nanoparticles in the first quantum dot well are operable to emit red light, and the plurality of nanoparticles in the second quantum dot well are operable to emit green light. In further embodiments, the reflective display component further comprises a blue color filter positioned above the third well operable to pass blue light to and from the third well. In still further embodiments, the reflective display component also includes a green color filter positioned above the second quantum dot well operable to pass green light to and from the second quantum dot well, where the green color filter is operable to absorb light having a wavelength longer than the green light. In yet additional embodiments, the electrowetting layer includes a first, second, and third electrowetting compartment aligned above the first and second quantum dot wells and the third well, where the first, second, and third electrowetting compartments each include an opaque liquid in contact with an electrowetting substrate surface, and where a surface coverage of the opaque liquid on the electrowetting substrate surface is adjustable in response to an electric field applied to the electrowetting substrate surface. In more embodiments, the first, second, and third electrowetting compartments are also independently operable to adjust the transmission of light emitted from the first and second quantum dot wells and the third well through the electrowetting layer to greater than or about 60%. In still more embodiments, the opaque liquid on the surface of the electrowetting substrate is fully responsive to the electric field applied to the electrowetting substrate surface in less than or about 20 milliseconds.

Embodiments of the present technology also include reflective display components that include a microwell layer that includes at least one red quantum dot well that includes a reflective layer lining an interior wall of the well, and a first set of nanoparticles configured to emit red light. The microwell layer further includes at least one green quantum dot well that includes the reflective layer lining the interior wall of the well, a second set of nanoparticles configured to emit green light, and a green color filter positioned on a top portion of the green well, where the green color filter is operable to pass green light to and from the green quantum dot well, and where the green color filter is operable to absorb light having a wavelength longer than the green light. The microwell layer still further includes at least one blue well that includes the reflective layer lining the interior wall of the well, and a blue color filter positioned on a top portion of the blue well and operable to pass blue light to and from the blue well. The reflective display components also include an electrowetting layer positioned above the microwell layer. The electrowetting layer is operable to independently adjust an intensity of light emitted from each of the red and green quantum dot wells and each of the blue wells in the microwell layer.

In additional embodiments, the reflective display components further include a first light guide layer positioned above or below the electrowetting layer, where the light guide layer is operable to distribute white light to the red and green quantum dot wells and the blue wells in the microwell layer. In further embodiments, the reflective display components further include a second light guide layer in contact with the first light guide layer, where the second light guide layer is operable increase a color temperature of an image displayed by the reflective display component to greater than or about 6500K. In still further embodiments, the electrowetting layer further includes first, second, and third electrowetting compartments aligned above the red and green quantum dot wells and the blue well, respectively. The first, second, and third electrowetting compartments each comprise an opaque liquid in contact with an electrowetting substrate surface, where a surface coverage of the opaque liquid on the electrowetting substrate surface is adjustable in response to an electric field applied to the electrowetting substrate surface. In yet additional embodiments, each of the first, second, and third electrowetting compartments is operable to change a transmittance level of light passing through the electrowetting compartment by greater than or about 50%. In more embodiments, the blue wells can further include a third set of nanoparticles configured to emit blue light.

Embodiments of the present technology further include image display methods. The methods include exposing a reflective display component to a first light from a light source, and exciting nanoparticles in a quantum dot well in a microwell layer of the reflective display component with a portion of the first light, where the portion of the first light has passed through an electrowetting layer positioned between the light source and the microwell layer. The methods further include reflecting a second light emitted by the nanoparticles in the quantum dot well to a location outside the reflective display component to display a portion of the image, where the second light passes through the electrowetting layer. The image may be characterized by a brightness of greater than or about 2500 nits.

In additional embodiments, the first light is white light and the second light is red light or green light. In further embodiments, the electrowetting layer includes an electrowetting compartment aligned above the quantum dot well. The electrowetting compartment includes an opaque liquid in contact with an electrowetting substrate surface, where a surface coverage of the opaque liquid on the electrowetting substrate surface is operable to be adjusted in response to an electric field applied to the electrowetting substrate surface. In still further embodiments, the electrowetting compartment is operable to change a transmittance level of the first and the second light passing through the electrowetting compartment in less than or about 20 milliseconds. In yet additional embodiments, the electrowetting compartment is operable to change a transmittance level of the first and the second light passing through the electrowetting compartment by greater than or about 50%. In more embodiments, the reflective display component converts greater than or about 10% of the first light into the image displayed by the reflective display component. In still more embodiments, the methods further include exciting the nanoparticles in the quantum dot well with a second light from a second light source coupled to a light guide layer, where the light guide layer is positioned above or below the electrowetting layer.

Embodiments of the present technology provide reflective display components and devices that can display images with higher light conversion efficiencies than reflective display devices using conventional liquid crystal display technology. The higher light conversion efficiencies permit the display of significantly brighter images from reflected light of the same intensity. The present technology can also provide reflective display components with faster response times for changing the intensity of light transmitted from pixels in the display components. The faster response times (e.g., less than or about 5 milliseconds) permit the display of sharper video images than seen from reflective displays using conventional liquid crystal display technology. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes and are not to be considered of scale unless specifically stated to be of scale. Additionally, as schematics, the figures are provided to aid comprehension and may not include all aspects or information compared to realistic representations and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Reflective displays rely on an external light source, such as sunlight, to display images. They are easy to view and read in bright light, which helps explain their popularity for outdoor displays, electronic billboards, and e-book readers, among other applications. Reflective displays are also characterized by low power consumption since a significant portion of the light used to make an image comes from an external source. For many display applications, reflective displays are several times more energy-efficient than comparable transmissive displays that power a light source to display an image.

Unfortunately, the advantageous features of reflective displays are often overshadowed by their shortcomings. In many cases, reflective displays rely on liquid crystals to switch on and off the individual pixels of the display that collectively form an image. The liquid crystals control the passage of light by changing the orientation of the crystals in response to an externally applied electric field. When the electric field aligns the crystals in one direction, polarized light having a particular orientation relative to the crystals is absorbed by the crystal to create a dark pixel. When the electric field (or its absence) aligns the crystals in a second direction (e.g., orthogonal to the first direction), the polarized light is transmitted through the liquid crystals to create an illuminated pixel. A more recent variation on this liquid crystal display technology replaces some or all the liquid crystals with polarized dyes (e.g., dichroic dyes) that absorb or transmit polarized lights depending on the orientation of the dyes in an applied electric field.

It is often the case that the external light source shining on a reflective display is not polarized. Most of this light is not converted into the displayed images because it doesn't have the right polarization to be transmitted through the liquid crystal (or polarized dye) layer of the display. In bright light, this is not a problem because even a small fraction of the light is enough for someone to easily view the images generated. However, in dim light, or even typical light levels found in homes and offices, the low conversion levels characteristic of reflective displays using liquid crystals can render the generated images too faint to see.

The problem conventional reflective displays have with generating faint images is made worse if the display is trying to generate images with high contrast or an expanded color gamut. Both these features of image quality have a tradeoff with image brightness: the higher the contrast, or the wider the color gamut, the lower the image brightness in reflective liquid crystal displays.

Another shortcoming of reflective liquid crystal displays is the slow response times of the liquid crystals when displaying moving images. In many cases, the slow response times of greater than 20 milliseconds can create a noticeable blurring of a fast-changing image and result in poor image quality. The response times become even slower when trying to increase the image contrast between light and dark pixels in an image. The degree of contrast depends in part on the magnitude of the change in transmittance of light passing through the liquid crystal when it is in an on and off state. The magnitude of this change is referred to as the swing, and for most conventional liquid crystal displays, it is less than 50%. In a fully "off" orientation, the liquid crystal has a light transmittance of less than or about 2%, while in a fully "on" orientation, the liquid crystal has a light transmittance of less than or about 50%. Increasing the swing of a liquid crystal layer normally requires increasing the density of the crystals or polarized dyes in the surrounding liquid medium. However, the increased density of the crystals and dyes slows their response times between fully on and off states. Thus, increasing the image contrast in reflective liquid crystal displays can further slow their response times and further degrade the quality of the moving images being displayed.

Embodiments of the present technology address these and other shortcomings with reflective liquid crystal displays by replacing the liquid crystals and polarized dyes with an electrowetting layer. In embodiments, the electrowetting layer includes a plurality of electrowetting compartments, each of which includes an opaque liquid that has adjustable coverage across an electrowetting substrate surface. In embodiments, the opaque liquid covers about 100% of the compartment's substrate surface in a fully off state, resulting in a transmission of light through the compartment of less than or about 10%, less than or about 5%, less than or about 2%, or less. In additional embodiments, an electrostatic field applied to the compartment's substrate surface adjusts the coverage of the opaque liquid on the surface. In further embodiments, the applied electrostatic field can adjust the coverage of the opaque liquid on the area of the compartment's substrate surface to less than or about 10% when the compartment is in a fully on state. In embodiments, the transmission of light through the compartment in the fully on state is greater than or about 50%, greater than or about 60%, greater than or about 70%, or more. Thus, the swing in the light transmittance of a reflective display that uses an electrowetting layer according to embodiments of the present technology can be greater than or about 50%, greater than or about 60%, greater than or about 70%, or more.

Embodiments of the present technology may be characterized by a swing in the light transmittance that is, in absolute terms, an average of 10%, 20%, or higher than the swing observed in conventional reflective liquid crystal displays. In additional embodiments of the present technology, the increased swing in the reflective displays does not come at a cost to the switching response time. In embodiments, the opaque liquid in the electrowetting compartments can go from a fully off state to a fully on state in less than or about 5 milliseconds. Reflective displays, according to embodiments of the present technology, provide high contrast combined with fast response times.

Embodiments of the present reflective displays and display components that include an electrowetting layer do not favor the transmittance of polarized light over unpolarized light. This can make these displays and display components well suited for quantum dot technology. Quantum dots emit unpolarized light in all directions, even when they are excited by polarized light. The electrowetting layer does not block light emitted by the quantum dots that fall outside a narrow polarization direction, which allows a greater percentage of light emitted by the quantum dots to be transmitted through the layer. In contrast, a small fraction of the unpolarized light emitted by the quantum dots is transmitted through a liquid crystal layer. Most of the light is blocked by the liquid crystals because it falls outside the narrow band of light that is aligned in the crystals' direction of polarization. The greater percentage of quantum dot light transmitted by the present reflective displays allows them to convert a greater percentage of a source light into an image than reflective liquid crystal displays. In embodiments, the present reflective displays that include an electrowetting layer may be characterized by a source light conversion efficiency of greater than or about 10%, greater than or about 10%, greater than or about 20%, greater than or about 30%, greater than or about 40%, greater than or about 50%, or more.

Figure 1:
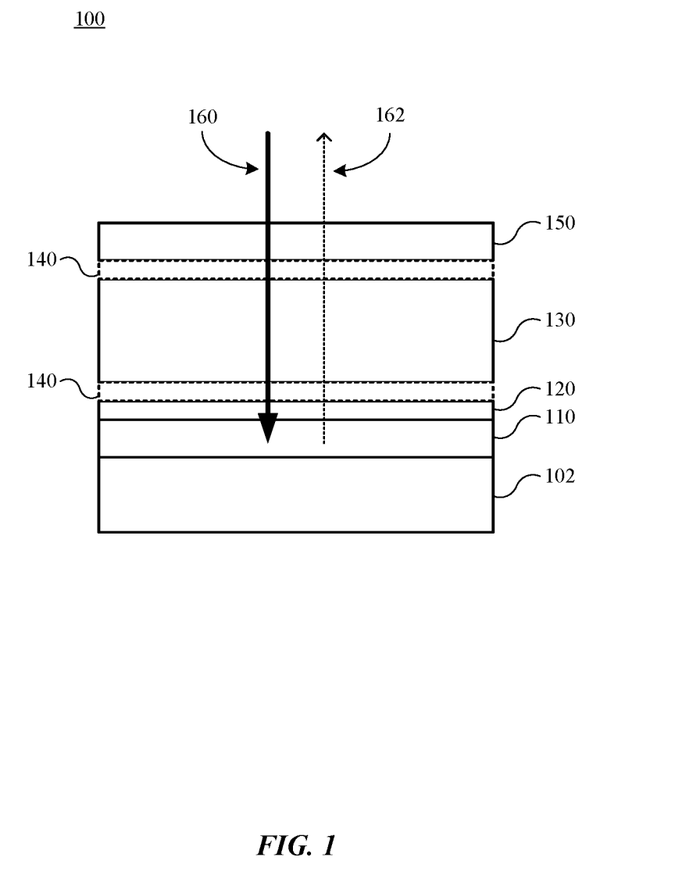
FIG. 1 shows a simplified schematic of a reflective display component according to some embodiments of the present technology.

FIG. 1 shows as a simplified schematic of a portion of a reflective display device component 100 according to embodiments of the present technology. In embodiments, the device component 100 may include a substrate support layer 102 that provides support for additional device layers positioned on the substrate support layer. In additional embodiments, the substrate support layer 102 may be a planar layer or may be a curved layer. In further embodiments, the substrate support layer 102 may be a rigid layer made from a semiconductor, an organic polymer, an inorganic ceramic, or a metal, among other materials.

In additional embodiments, a reflective layer 110 may be positioned on the substrate support layer 102. In further embodiments, the reflective layer may be a microwell layer that includes both a plurality of quantum dot wells and wells that do not include quantum dot materials such as light-emitting nanocrystals. In still further embodiments, each of the wells, whether filled with quantum dot materials or not, may include a reflective liner formed on the interior surfaces of the well. In more embodiments, a portion of the wells are quantum dot wells that also include a quantum dot material that fills at least a portion of the well. In still more embodiments, all of the well are quantum dot wells that include a quantum dot material. In embodiments, the reflective liner may be made from one or more reflective metals such as aluminum, silver, and tin, among other metals. In additional embodiments, the reflective liner may be made from dielectric materials such as silicon oxide, silicon nitride, strontium oxide, titanium oxide, among other dielectric materials. In still further embodiments, the reflective liner layer may be made of an alternating stack of silicon oxide and silicon nitride layers. In more embodiments, the reflective liner layer may be characterized as a bragg reflector or spectralon. In yet additional embodiments, the reflective liner may be characterized by a thickness of less than or about 5 µm, less than or about 4 µm, less than or about 3 µm, less than or about 2 µm, less than or about 1 µm, less than or about 0.75 µm, less than or about 0.5 µm, less than or about 0.25 µm, or less.

In further embodiments, the wells in the microwell layer that are quantum dot wells may include a quantum dot material such as nanoparticles that are operable to absorb more energetic wavelengths of light to form an excited state that emits a second, less energetic wavelength of light while returning to their ground state. In embodiments, a plurality of nanoparticles characterized by light emission of a color in the visible spectrum may be held in a quantum dot well in the microwell layer. In additional embodiments, a first plurality of the nanoparticles characterized by red light emission may be held in a first set of quantum dot wells, a second plurality of nanoparticles characterized by green light emission may be held in a second set of quantum dot wells. In still further embodiments, the microwell layer may optionally include a third plurality of nanoparticles characterized by blue light emission that may be held in a third set of quantum dot wells. In other embodiments, the microwell layer may be free of the third set of quantum dot wells that include the third plurality of nanoparticles characterized by blue light emission. In at least some of these embodiments, the microwell layer includes a third set of wells that lack quantum dot material. In these embodiments, the third set of wells may include a blue color filter operable to pass blue color light to and from the wells.

In embodiments, light from a light source outside the reflective device display component 100 may be absorbed by the nanoparticles in the quantum dot wells, and the excited nanoparticles emit light of a red or green (and in some embodiments, blue) color depending on the quantum dot well. A portion of the light emitted by the nanoparticles is in a direction that directly exits the quantum dot well. Another portion of the emitted light is reflected out of the quantum dot well by the reflective liner layer on the interior surface of the well.

In additional embodiments, the nanoparticles may be characterized by an average particle size that causes them to emit visible light. In yet further embodiments, the nanoparticles may be characterized by an average particle size of less than or about 50 nm, less than or about 25 nm, less than or about 10 nm, less than or about 9 nm, less than or about 8 nm, less than or about 7 nm, less than or about 6 nm, less than or about 5 nm, less than or about 4 nm, less than or about 3 nm, less than or about 2 nm, less than or about 1 nm, or less. In more embodiments, the excited nanoparticles may be characterized by the emission of red light, green light, or blue light, among other colors of light. In further embodiments, the nanoparticles may be made from inorganic materials such as lead sulfide, lead selenide, cadmium selenide, cadmium sulfide, cadmium telluride, indium arsenide, indium phosphide, additional phosphors, and silicon germanium, among other inorganic materials.

In further embodiments, the reflective display device component 100 may include a color filter 120 formed over portions of the reflective layer 110. In embodiments, the color filter 120 compensates for differences in the intensity of different colors of light emitted from the reflective layer 110. In additional embodiments, color filters are aligned above the wells emitting blue and green light. In further embodiments, the quantum dot wells operable to emit red light may not include a color filter. In still further embodiments, the color filter 120 may include one or more blue color filters aligned above the set of wells projecting blue light. In additional embodiments, the blue color filters may be operable to absorb light having a wavelength longer than blue light (e.g., wavelengths greater than or about 450 nm). In more embodiments, the color filter 120 may include one or more green color filters aligned above the set of quantum dot wells emitting green light. In yet more embodiments, the green color filters may be operable to absorb light having a wavelength longer than green light (e.g., wavelengths greater than or about 530 nm).

In additional embodiments, the reflective display device component 100 may also include an electrowetting layer 130 posited above the reflective layer 110. In embodiments, the electrowetting layer is operable to independently adjust the intensity of the light absorbed by and projected from the nanocrystals in each of the quantum dot wells in the reflective layer 110. The electrowetting layer is also operable to independently adjust the intensity of the light transmitted through and reflected from the wells that do not include quantum dot material. In additional embodiments, these adjustments to the transmitted light may be made by independently adjusting the amount of light transmitted through the electrowetting layer 130 to and from each well in the reflective layer 110. In further embodiments, these independent adjustments may be made by aligning a plurality of electrowetting compartments in the electrowetting layer 130 above the plurality of wells in the reflective layer 110. In more embodiments, each electrowetting compartment includes an opaque liquid in contact with a surface of an electrowetting substrate. The amount of light transmitted through the electrowetting compartment depends on the extent of the coverage of the opaque liquid across the electrowetting substrate surface. In embodiments, the coverage of the opaque liquid on the electrowetting substrate surface may be adjusted by applying an electric field to the electrowetting substrate surface.

In additional embodiments, when no electric field is applied to the electrowetting substrate surface, the opaque liquid may cover 100% of the surface. The 100% coverage by the opaque liquid creates transmission levels through the electrowetting compartment of the electrowetting layer 130 of less than or about 10%, less than or about 5%, less than or about 2%, less than or about 1%, or less. In still additional embodiments, when a strong electric field is applied to the electrowetting substrate surface, the opaque liquid may bead up and cover less than or about 99% of the surface, less than or about 90% of the surface, less than or about 80% of the surface, less than or about 70% of the surface, less than or about 60% of the surface, 50% of the surface, less than or about 40% of the surface, less than or about 30% of the surface, less than or about 20% of the surface, less than or about 10% of the surface, less than or about 5% of the surface, or less. This results in a transmission of light through the electrowetting compartment of the electrowetting layer 130 that is greater than or about 50%, greater than or about 60%, greater than or about 70%, greater than or about 80%, greater than or about 90%, or more. In yet more embodiments, an adjustable strength electric field applied to the electrowetting substrate surface causes the opaque liquid to bead to the point that it covers the surface to an intermediate extent between 100% coverage and less than or about 5% coverage. In further embodiments, the percentage by area of the electrowetting substrate surface that is not covered by the opaque liquid is directly proportional to the transmittance of light through that electrowetting compartment of the electrowetting layer 130.

In further embodiments, the reflective display device component 100 may also include a light guide layer 140 positioned above or below the electrowetting layer 130. In embodiments, the light guide layer 140 may be operable to distribute white light emitted from an external light source onto the display device component 100 across the area of the reflective layer 110. In additional embodiments, the light guide layer 140 may be operable to distribute blue light projected from the reflective layer 110. In embodiments, the blue light guide layer may be operable to increase the color temperature of an image that is displayed by the display device component. In embodiments the blue light guide may increase the color temperature to greater than or about 6500K, greater than or about 6600K, greater than or about 6700K, greater than or about 6800K, greater than or about 6900K, greater than or about 7000K, or more. In yet more embodiments, the light guide layer 140 may include two or more light guide layers operable to distribute light of different wavelength ranges. In embodiments, these multilayer light guide layers 140 may include a first light guide layer operable to distribute white light and a second light guide layer operable to distribute blue light. The first light guide layer may be operable to distribute light having a broad range of wavelengths in the visible portions of the electromagnetic spectrum (e.g., about 400 nm to about 700 nm). The second light guide layer may be operable to distribute light having blue color (e.g., about 380 nm to about 500 nm).

In additional embodiments, an internal light source (not shown) may be coupled to the light guide layer 140 to help illuminate images displayed by the display device component 100. In embodiments, the internal light source may include a single-component source of white light. In further embodiments, the internal light source may include a multi-component source such as red, green, and blue light emitting diodes. In still further embodiments, the light guide layer 140 may be operable to distribute light from both a broad-spectrum white light source and a narrower-spectrum colored light source (e.g., a blue light source). In yet additional embodiments, the light guide layer 140 may be a multilayer light guide that includes at least a first light guide layer operable to distribute while light, and a second light guide layer operable to distribute colored light (e.g., blue light). In still further embodiments, independent internal light sources may be coupled to each light guide layer of the multilayer light guide.

In more embodiments, the reflective display device component 100 may include a cover layer 150 positioned above the electrowetting layer 130 and, if present, the light guide layer 140. The cover layer 150 protects the underlying layers of the reflective display device component 100 from environmental contaminants. In embodiments, the cover layer 150 may be an optically clear layer made of glass or translucent polymer, among other kinds of optically clear materials.

In embodiments, light 160 from a light source (not shown) external to the reflective display device component 100 may be directed at the component. In additional embodiments, the external light source may be natural light (e.g., sunlight) or manufactured light such as light from one or more types of incandescent, fluorescent, or LED light sources. In more embodiments, the external light source may be characterized by a brightness of greater than or about 100 lux (dim room light), greater than or about 500 lux (office lighting), greater than or about 1000 lux (high-brightness lighting), greater than or about 2500 lux, greater than or about 5000 lux, greater than or about 10000 lux (outdoor shade on bright summer day), greater than or about 50000 lux, greater than or about 100000 lux (peak solar illuminance), or more.

In further embodiments, a portion of the light 160 passes through the layers of the reflective device component 100, including the light guide layer 140, the electrowetting layer 130 and the color filter layer 120, among other layers. In additional embodiments, some of the light 160 reaching the light guide layer 140 may be redistributed to reach a wider area of one or more underlying layers, including the reflection layer 110. At least some of the light 160 reaching the reflection layer 110 directly from the light source and from the light guide layer 140 may be absorbed by the nanocrystals in the quantum dot wells of the microwell layer in the reflective layer 110. The absorbed portion of the light 160 may excite the nanocrystals and cause them to emit light of a particular color that depends on characteristics of the nanocrystals, such as their size. The light 162, which includes the emitted light from the excited nanocrystals in the quantum dot wells, is directed back out of the reflective display device component 100 to form a displayed image. In embodiments, the light 162 projected from the display device component 100 may be characterized by a brightness of greater than or about 100 nits, greater than or about 250 nits, greater than or about 500 nits, greater than or about 750 nits, greater than or about 1000 nits, greater than or about 2500 nits, or more.

In further embodiments, the amount of the light 160 converted to into light 162 that forms a displayed image may be greater than or about 5%, greater than or about 10%, greater than or about 20%, greater than or about 30%, greater than or about 40%, greater than or about 50%, or more. This is a significantly higher conversion efficiency than for reflective liquid crystal displays that typically have conversion efficiencies of less than 10%, less than 5%, less than 1%, or less. In addition, because the reflective layer 110 can generate and reflect unpolarized light, and the electrowetting layer 130 can pass unpolarized light, the light 162 used to generate the displayed image from reflective device component 100 may be unpolarized. This can significantly increase the viewing angle between a viewer and the reflective device component 100 without distorting or dimming the displayed image.

Figure 2:
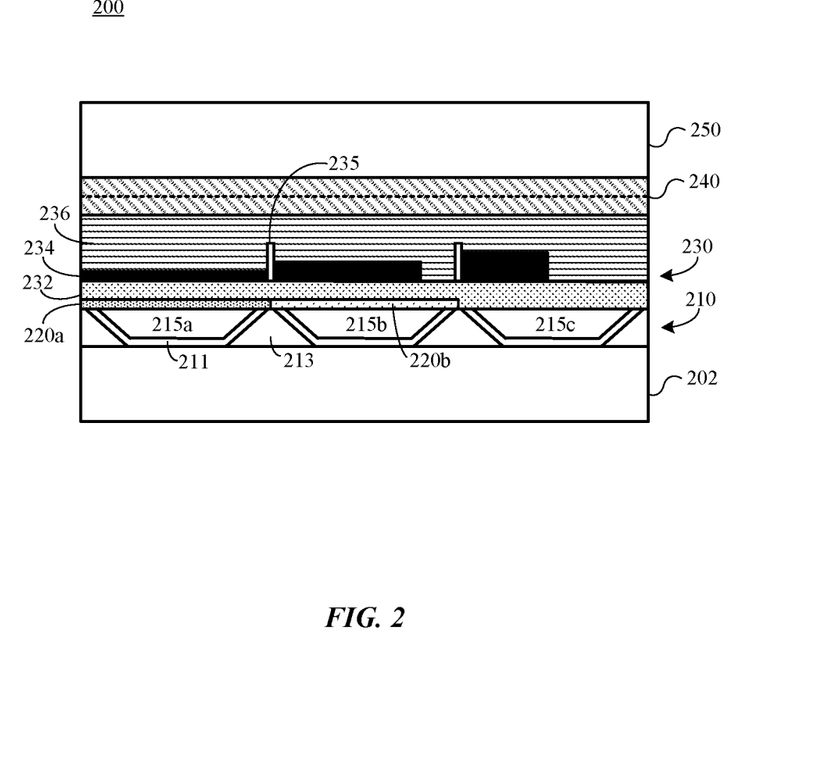
FIG. 2 shows another embodiment of a reflective display component according to some embodiments of the present technology.

Referring to FIG. 2, additional embodiments of a portion of a reflective display device component 200 according to embodiments of the present technology is shown. In embodiments, the reflective display device component 200 may include a substrate support layer 202 that provides support for additional device layers positioned on the substrate support layer. In further embodiments, a reflective layer 210 may be positioned on the substrate support layer 202. In embodiments, the reflective layer 210 may include a microwell layer that includes a plurality of wells formed in the substrate 213 of the microwell layer. In additional embodiments, the microwell layer substrate 213 may be an organic or inorganic material that is opaque to visible light. In more embodiments, the plurality of wells may be formed with one or more inner surfaces that may include a bottom surface and one or more sidewall surfaces recessed into the microwell layer substrate 213. The inner surfaces of each well may be lined with a reflective liner layer 211 operable to reflect light from the well through the reflective display device component 200 to project an image from the component. In embodiments, the reflective liner layer 211 may be made from one or more reflective metals such as aluminum, silver, and tin, among other metals. In additional embodiments, the reflective liner may be made from dielectric materials such as silicon oxide, silicon nitride, strontium oxide, titanium oxide, among other dielectric materials. In still further embodiments, the reflective liner layer may be made of an alternating stack of silicon oxide and silicon nitride layers. In more embodiments, the reflective liner layer may be characterized as a bragg reflector or spectralon. In additional embodiments, the reflective liner layer 211 may be characterized by a thickness of less than or about 5 µm, less than or about 4 µm, less than or about 3 µm, less than or about 2 µm, less than or about 1 µm, less than or about 0.75 µm, less than or about 0.5 µm, less than or about 0.25 µm, or less.

In embodiments, at least a portion of the wells 215a-c in the reflective layer 210 may be quantum dot wells may be filled with a plurality of nanocrystals that are operable to emit different colors of light. In some embodiments, the first well 215a may be free of quantum dot material. In additional embodiments, the first well 215a may be filled with a plurality of first nanocrystals 215a that are operable to emit blue light (e.g., light ranging in wavelength from 380 nm to 500 nm). In more embodiments, the second well 215b may be a quantum dot well filled with a plurality of second nanocrystals that are operable to emit green light (e.g., light ranging in wavelength from 530 nm to 550 nm). In still more embodiments, the third well 215c may be a quantum dot well filled with a plurality of third nanocrystals that are operable to emit red light (e.g., light ranging from 650 nm to 720 nm). In still further embodiments, the first, second, and third wells 215a-c may be subpixels of a Red, Green, Blue (RGB) pixel. In yet further embodiments, the first, second, and third wells may be repeated a plurality of times to make up the subpixels and pixels of the entire reflective layer 210 of the reflective display device component 200.

In additional embodiments, the reflective display device component 200 may include color filters 220a-b formed over a portion of the wells in the reflective layer 210. In embodiments, the color filter 220a includes a blue color filter aligned above the first well 215a.

The blue color filter 220a may be operable to transmit to and from the first well 215a, and operable to absorb light having wavelengths longer than blue light. In additional embodiments, the color filter 220b may be a green color filter aligned above the second well 215b filled with nanocrystals operable to emit green light. The green color filter may be operable to absorb light having wavelengths longer than green light. In the embodiment shown in FIG. 2, there is no color filter positioned over the third well 215c filled with nanocrystals operable to emit red light. In the embodiment shown, the color filters 220a-b reduce the intensity of blue and green light relative to red light that is projected from the wells 215a-c of the reflective layer 210.

In further embodiments, the reflective display device component 200 may include an electrowetting layer 230 positioned over the reflective layer 210 and, if present, the color filers 220a-b. In embodiments, the electrowetting layer 230 may include an electrowetting substrate layer 232 that forms an electrowetting substrate surface on which a group of electrowetting liquids is supported. In additional embodiments, the electrowetting liquids may include an opaque liquid 234 and a translucent liquid 236. In further embodiments, at least the opaque liquid 234 may be separated into electrowetting compartments by a plurality of partitions 235 that may be aligned with the peripheries of the wells 215a-c in the reflective layer 210. The partitions 235 are high enough to prevent the opaque liquid 234 in one electrowetting compartment from flowing into an adjacent electrowetting compartment.

In embodiments, the coverage of the opaque liquid 234 on the surface of the electrowetting substrate layer 232 may be adjustable depending on the strength of an electric field applied to the portion of the substrate layer that forms the bottom portion of the electrowetting compartment. In embodiments, a weaker applied electric field causes the opaque liquid 234 to wet more of the surface of the electrowetting substrate layer 232. In further embodiments, when the opaque liquid 234 wets 100% of the surface of the electrowetting substrate layer 232, almost no light is transmitted through the electrowetting compartment (e.g., less than or about 10%, less than or about 5%, less than or about 2%, or less of the light projected on the electrowetting compartment). In still further embodiments, when the opaque liquid wets less than or about 10% of the surface of the electrowetting substrate layer 232, greater than 50%, greater than 60%, greater than 70%, greater than 80%, greater than 90%, or more of the light reaching the electrowetting layer 230 may pass through the layer.

In more embodiments, the electrowetting liquids in the electrowetting layer 230 may include at least two liquids of different degrees of polarization. In embodiments, the opaque liquid 234 may be a non-polar liquid, while the translucent liquid 236 may be a polar liquid. The differences in the polarities of the electrowetting liquids facilitate the degree of wetting of the opaque liquid 234 on the surface of the electrowetting substrate layer 232. In additional embodiments, the opaque liquid 234 may include a non-polar oil and one or more dyes that absorb visible light, among other non-polar liquids. In further embodiments, the translucent liquid 236 may include water and short-chained alcohols, among other polar liquids. In yet more embodiments, the surface of the electrowetting substrate layer 232 may be made from a translucent, non-polar material such as a translucent organic polymer (e.g., a translucent fluoropolymer), among other materials. In still more embodiments, the bulk of the electrowetting substrate layer 232 may be made from a translucent, electrically conductive material such as indium-tin-oxide, indium-zinc-oxide, aluminum-zinc-oxide, among materials.

In additional embodiments, the reflective display device component 200 may include a light guide layer 240 positioned above or below the electrowetting layer 230. In the embodiment shown in FIG. 2, the light guide layer 240 is positioned above the electrowetting layer 230. In embodiments, the light guide layer 240 includes a first light guide layer operable to distribute blue light across a wider area of the reflective layer 210 and a wider area of the image projected by the reflective display device component 200. In further embodiments, the light guide layer 240 also includes a second light guide layer operable to distribute white light from an external light source across a wider area of the layers of component 200, including the reflective layer 210.

In still further embodiments, the reflective display device component 200 may include a cover layer 250 positioned above the light guide layer 240. The cover layer 250 protects the underlying layers of the reflective display device component 200 from environmental contaminants. In embodiments, the cover layer 250 may be an optically clear layer made of glass or translucent polymer, among other kinds of optically clear materials.

Figure 3A:
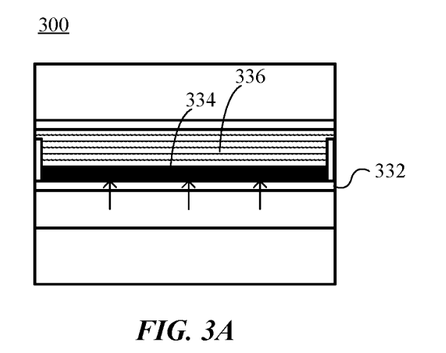
FIGS. 3A-C show embodiments of an electrowetting layer of a reflective device component in various open and closed states according to embodiments of the present technology.
Figure 3B:
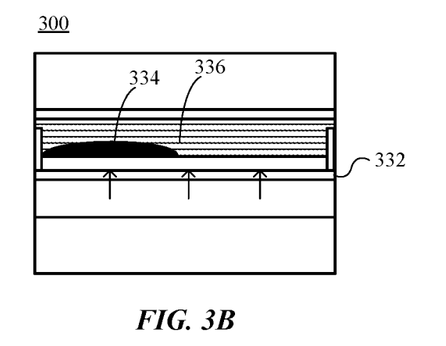
Figure 3C:
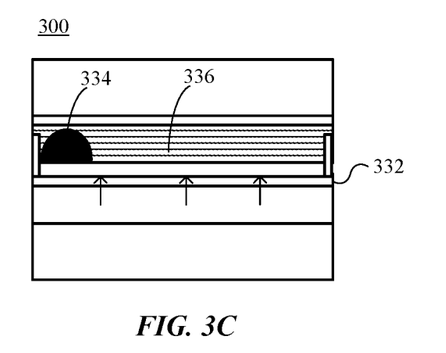

FIGS. 3A-C show an embodiment of a single electrowetting compartment 300 that includes an opaque liquid 334 covering the surface of electrowetting substrate layer 332 to various extents. FIG. 3A shows the opaque liquid 334 covering 100% of the area of the surface of the electrowetting substrate layer 332, allowing none of the translucent liquid 336 to contact the surface. In this state, almost none of the light reaching the electrowetting compartment 300 may be transmitted through the compartment, and the compartment may be characterized as being fully off. FIG. 3B shows the opaque liquid 334 covering about 50% of the area of the electrowetting substrate layer 332. In this state, about 50% of the light reaching the electrowetting compartment 300 may be transmitted through the compartment, and the compartment may be characterized as being in an intermediate state between fully off and fully on. FIG. 3C shows the opaque liquid 334 covering less than 10% of the area of the electrowetting substrate layer 332. In this state, greater than 50%, greater than 60%, greater than 70%, greater than 80%, greater than 90%, or more, of the light reaching the electrowetting compartment 300 may be transmitted through the compartment, and the compartment may be characterized as being fully on.

In embodiments, the time it takes for the opaque liquid 334 to be adjusted between the fully off state covering 100% of the surface of the electrowetting substrate layer 332 to the fully on state covering less than 10% of the area may be less than or about 20 milliseconds, less than or about 15 milliseconds, less than or about 10 milliseconds, less than or about 5 milliseconds, less than or about 4 milliseconds, less than or about 3 milliseconds, less than or about 2 milliseconds, less than or about 1 millisecond, or less.

Figure 4:
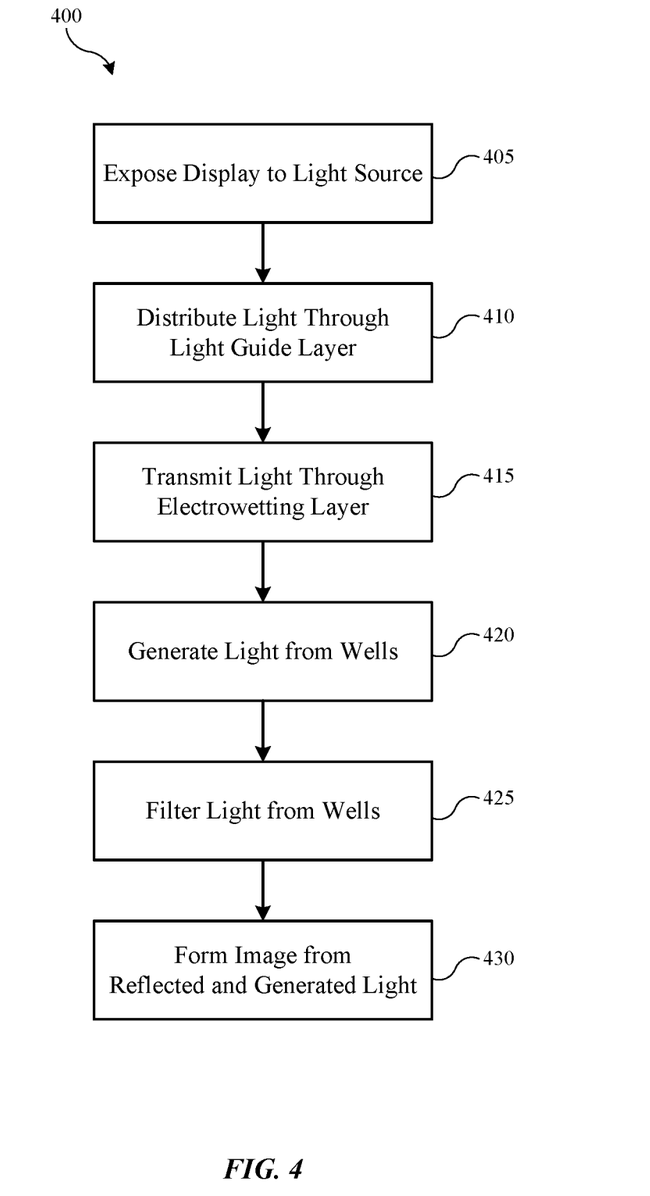
FIG. 4 shows a flowchart with selected operations in a method of displaying an image according to some embodiments of the present technology.

Embodiments of the above-described reflective display devices and components shown in FIGS. 1-3 may be used to display images according to embodiments of the present methods. FIG. 4 shows exemplary operations in a method 400 of displaying images according to embodiments of the present technology. Method 400 may include one or more operations prior to the initiation of the method, including activating the device and adjusting characteristics of the images displayed, among other operations that may be performed prior to the described operations. The method may further include a number of optional operations, which may or may not be specifically associated with some embodiments of methods according to the present technology. For example, many of the operations are described in order to provide a broader scope of the processes performed but are not critical to the technology or may be performed by alternative methodology, as will be discussed further below. It is to be understood that the figures illustrate only partial schematic views, and the systems and methods may contain any number of additional components and operations having a variety of characteristics and aspects.

Referring now to FIG. 4, method 400 may include exposing the reflective display device to a light source at operation 405. The reflective display device may be a device or device component according to an embodiment of the present technology, such as the device components shown in FIGS. 1-3. In embodiments, the light source may be an external light source. In further embodiments, the external light source may be a natural light source such as sunlight, or a manufactured light source, such as light from one or more incandescent lights, fluorescent lights, or LED lights, among other manufactured light sources. In still further embodiments, the light source may be an internal light source integrated into the reflective display device or device component. In embodiments, the internal light source may include an LED light source positioned above an electrowetting layer and a reflective layer of the reflective display device. In further embodiments, the internal light source may be coupled to a light guide layer that distributes the light emitted from the internal light source across a larger area of the electrowetting layer and reflective layer.

An internal light source may provide additional light for a projected image from the reflective display device. In embodiments, a portion of the light from the internal light source may be transmitted to wells that reflect and/or emit colored light that is projected from the reflective layer. In further embodiments, a portion of the light from the internal light source may be directly reflected by the reflective layer to form part of a displayed image from the reflective display device. In contrast, a conventional transmissive display device uses an internal light source to excite quantum dot materials in a microwell layer in order to generate colored light that is directly projected into a displayed image without reflection.

In embodiments, method 400 may further include distributing light through a light guide layer at operation 410. As noted above, in embodiments, the light provided to the light guide layer may be supplied from an external or an internal light source. In further embodiments, the light may be white light having wavelengths distributed across the visible spectrum (e.g., about 400 nm to about 700 nm). The light distributed through the light guide layer may be distributed across underlying layers of the reflective display device or device component, including an electrowetting layer and a reflective layer. In embodiments, the light guide layer more evenly distributes light emitted from an external or internal source across the underlying layers of the reflective display device or device component so that they can display images with more uniform brightness across the image.

In embodiments, method 400 may still further include transmitting light through an electrowetting layer at operation 415. In embodiments, the transmitted light may be a portion of the source light to which the reflective display device or device component is exposed in operation 405. In additional embodiments, the transmitted light may be a portion of the light emitted from a reflective layer positioned below the electrowetting layer. In further embodiments, the electrowetting layer may control the amount of light transmitted through the layer at various points across the area of the layer in order to help form a displayed image. As noted above, the transmittance of the light through each point on the electrowetting layer may swing from near 0% transmittance to greater than or about 90% of the light supplied to the electrowetting layer. As also noted, the electrowetting layer may change the transmittance level of the light at each point from fully transmissive (e.g., fully on) to fully opaque (e.g., fully off) in less than or about 20 milliseconds, less than or about 15 milliseconds, less than or about 10 milliseconds, less than or about 5 milliseconds, less than or about 4 milliseconds, less than or about 3 milliseconds, less than or about 2 milliseconds, less than or about 1 millisecond, or less.

In embodiments, method 400 may yet also include generating light from quantum dot wells at operation 420. In embodiments, the quantum dot wells generate light by having the nanocrystals that fill at least a portion of the wells absorb light and become excited. The excited nanocrystals emit light of a predetermined color as they return to an unexcited state. In embodiments, the colored light emitted by the nanocrystals may be characterized by a full-width half-maximum (FWMH) wavelength range that is less than or about 100 nm, less than or about 75 nm, less than or about 50 nm, less than or about 40 nm, less than or about 30 nm, less than or about 20 nm, less than or about 10 nm, or less.

In further embodiments, the colored light emitted by the nanocrystals may be unpolarized light. In still further embodiments, a portion of the light emitted by the nanocrystals may be directly projected onto layers of the display that are positioned above the reflective layer that includes the quantum dot wells. An additional portion of the light may be reflected off reflective liner layers in the quantum dot well before being projected onto the layers positioned above the reflective layer that includes the quantum dot wells.

In embodiments, method 400 may further include filtering light emitted from reflective wells, including quantum dot wells, at operation 425. In further embodiments, blue and green light reflected and emitted from subsets of the wells may be filtered to reduce the intensity of blue and green light in the displayed image relative to red light. In these embodiments, a first set of blue color filters may be positioned on the subset of wells operable to reflect blue light in order to reduce the emission of light having wavelengths less than or about that of blue light (e.g., less than or about 500 nm, less than or about 475 nm, less than or about 450 nm, less than or about 425 nm, less than or about 400 nm, or less). In additional embodiments, a second set of green color filters may be position on the subset of quantum dot wells operable to emit green light in order to reduce the emission of wavelengths less than or about that of green light (e.g., less than or about 550 nm).

In embodiments, method 400 may still additionally include forming an image from the reflected and generated light at operation 430. In embodiments, the image formed by the light of the reflective display device or device component may be characterized by a brightness of greater than or about 100 nits, greater than or about 250 nits, greater than or about 500 nits, greater than or about 750 nits, greater than or about 1000 nits, greater than or about 2500 nits, or more.

Embodiments of the present technology permit the reflective display of images with increased brightness and response times compared to reflective displays that use conventional LCD technology. The embodiments include reflective display devices and device components that include electrowetting layers and reflective layers that incorporate quantum dot technology. The combination of these layers, and additional layers that include light guide layers and color filter layers, permit the display of images with a wider color gamut, higher contrast ratios, and sharper video than seen in conventional LED technology. The display devices and device components, according to the present technology, are also advantaged by the low power consumption of reflective display devices compared to transmissive display devices that require significantly more power for light-emitting diodes (LEDs) and other high-energy-consuming light sources.

In the preceding description, for the purposes of explanation, numerous details have been set forth in order to provide an understanding of various embodiments of the present technology. It will be apparent to one skilled in the art, however, that certain embodiments may be practiced without some of these details or with additional details. For example, other substrates that may benefit from the wetting techniques described may also be used with the present technology.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a nanocrystal" includes a plurality of such nanocrystals, and reference to "the period of time" includes reference to one or more periods of time and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups. In addition, the words "above", "below", "over", "under", "in front of", "behind", etc., indicate the relative positioning of elements, not their absolute positioning.

What is claimed is:

1. A reflective display component comprising:
a microwell layer comprising a first and a second quantum dot well that each include a plurality of nanoparticles configured to emit a color of light; and
an opaque liquid layer positioned above at least a portion of the microwell layer, wherein the opaque liquid layer is operable to independently adjust an intensity of light absorbed by the first and second quantum dot wells in the microwell layer.

2. The reflective display component of claim 1, wherein the microwell layer further comprises a third well, and wherein the first and the second quantum dot wells and the third well include a reflective layer lining an interior wall of each of the wells.

3. The reflective display component of claim 1, wherein the reflective display component further comprises a light guide layer positioned above or below the opaque liquid layer, wherein the light guide layer is operable to distribute light projected on the reflective display component into the first and second quantum dot wells.

4. The reflective display component of claim 1, wherein the plurality of nanoparticles in the first quantum dot well are operable to emit red light, and the plurality of nanoparticles in the second quantum dot well are operable to emit green light.

5. The reflective display component of claim 2, wherein the third well includes a plurality of nanoparticles operable to emit blue light.

6. The reflective display component of claim 2, wherein the reflective display component further comprises a blue color filter positioned above the third well operable to pass blue light to and from the third well.

7. The reflective display component of claim 6, wherein the reflective display component further comprises a green color filter positioned above the second quantum dot well operable to pass green light to and from the second quantum dot well, and wherein the green color filter is operable to absorb light having a wavelength longer than the green light.

8. The reflective display component of claim 2, wherein the opaque liquid layer comprises a first, second, and third-electrowetting compartment aligned above the first and second quantum dot wells and the third well, wherein the first, second, and third electrowetting compartments each comprise an opaque liquid in contact with an electrowetting substrate surface, and further wherein a surface coverage of the opaque liquid on the electrowetting substrate surface is operable to be adjusted in response to an electric field applied to the electrowetting substrate surface.

9. The reflective display component of claim 8, wherein the first, second, and third-electrowetting compartments are independently operable to adjust a transmission of light emitted from the first and second quantum dot wells and the third well through the opaque liquid layer to less than or about 10%.

10. The reflective display component of claim 9, wherein the first, second, and third electrowetting compartments are also independently operable to adjust the transmission of light emitted from the first and second quantum dot wells and the third well through the opaque liquid layer to greater than or about 60%.

11. The reflective display component of claim 8, wherein the opaque liquid on the surface of the electrowetting substrate is fully responsive to the electric field applied to the electrowetting substrate surface in less than or about 20 milliseconds.

12. An image display method comprising:
exposing a reflective display component to a first light from a light source; and
exciting nanoparticles in a quantum dot well in a microwell layer of the reflective display component with a portion of the first light, wherein the portion of the first light has passed through an opaque liquid layer at least partially positioned between the light source and the microwell layer; and
reflecting a second light emitted by the nanoparticles in the quantum dot well to a location outside the reflective display component to display a portion of the image.

13. The image display method of claim 12, wherein the image is characterized by a brightness of greater than or about 100 nits.

14. The image display method of claim 12, wherein the first light comprises sunlight.

15. The image display method of claim 12, wherein the first light is white light and the second light is red light or green light.

16. The image display method of claim 12, wherein the opaque liquid layer comprises an electrowetting compartment aligned above the quantum dot well, and wherein the electrowetting compartment comprises an opaque liquid in contact with an electrowetting substrate surface, and further wherein a surface coverage of the opaque liquid on the electrowetting substrate surface is operable to be adjusted in response to an electric field applied to the electrowetting substrate surface.

17. The image display method of claim 16, wherein the-electrowetting compartment is operable to change a transmittance level of the first and the second light passing through the electrowetting compartment in less than or about 20 milliseconds.

18. The image display method of claim 16, wherein the electrowetting compartment is operable to change a transmittance level of the first and the second light passing through the electrowetting compartment by greater than or about 50%.

19. The image display method of claim 12, wherein the reflective display component converts greater than or about 10% of the first light into the image displayed by the reflective display component.

20. The image display method of claim 12, wherein the method further comprises exciting the nanoparticles in the quantum dot well with a second light from a second light source coupled to a light guide layer, wherein the light guide layer is positioned above or below the opaque liquid layer.

* * * * *